(12) United States Patent
Gupta et al.

(10) Patent No.: US 10,977,143 B2
(45) Date of Patent: Apr. 13, 2021

(54) MIRRORED WRITE AHEAD LOGS FOR DATA STORAGE SYSTEM

(71) Applicant: VMware, Inc., Palo Alto, CA (US)

(72) Inventors: Abhishek Gupta, Sunnyvale, CA (US); Richard P. Spillane, Mountain View, CA (US); Kapil Chowksey, Cupertino, CA (US); Rob Johnson, Palo Alto, CA (US); Wenguang Wang, Santa Clara, CA (US)

(73) Assignee: VMware, Inc., Palo Alto, CA (US)

( * ) Notice: Subject to any disclaimer, the term of this patent is extended or adjusted under 35 U.S.C. 154(b) by 276 days.

(21) Appl. No.: 15/844,412

(22) Filed: Dec. 15, 2017

(65) Prior Publication Data

US 2019/0188097 A1 Jun. 20, 2019

(51) Int. Cl.
*G06F 11/20* (2006.01)
*G06F 11/30* (2006.01)
*G06F 3/06* (2006.01)
*G06F 11/34* (2006.01)

(52) U.S. Cl.
CPC ........ *G06F 11/2056* (2013.01); *G06F 3/0653* (2013.01); *G06F 11/3034* (2013.01); *G06F 11/3476* (2013.01)

(58) Field of Classification Search
CPC ............... G06F 11/2056; G06F 3/0653; G06F 11/3034; G06F 11/3476
See application file for complete search history.

(56) References Cited

U.S. PATENT DOCUMENTS

| | | | |
|---|---|---|---|
| 7,003,694 B1* | 2/2006 | Anderson, Jr. | G06F 11/2023 707/999.202 |
| 7,191,284 B1* | 3/2007 | Gupta | G06F 11/2064 711/114 |
| 2015/0261808 A1* | 9/2015 | Zhou | G06F 16/2343 707/703 |
| 2016/0077936 A1* | 3/2016 | Tang | G06F 11/2028 714/4.11 |
| 2019/0065542 A1* | 2/2019 | Baker | G06F 16/214 |

* cited by examiner

*Primary Examiner* — Michelle T Bechtold
(74) *Attorney, Agent, or Firm* — Loza & Loza, LLP

(57) ABSTRACT

Data storage system and method for managing transaction requests to the data storage system utilizes an active write ahead log and a standby write ahead log to apply the transaction requests to a storage data structure stored in a storage system of the data storage system.

12 Claims, 14 Drawing Sheets

MIRRORED WRITE AHEAD LOGS FOR DATA STORAGE SYSTEM

BACKGROUND

Write ahead logging is a technique for providing atomicity and durability in data storage systems, such as database systems and file systems. The central concept of write ahead logging is that changes to stored data are performed only after transaction entries, i.e., descriptions regarding those changes, have been recorded and committed in a persistent log, commonly known as a write ahead log. The transaction entries recorded in the write ahead log can then be used to recover from failures to ensure data integrity.

BRIEF DESCRIPTION OF THE DRAWINGS

Throughout the description, similar reference numbers may be used to identify similar elements.

DETAILED DESCRIPTION

Figure 1:
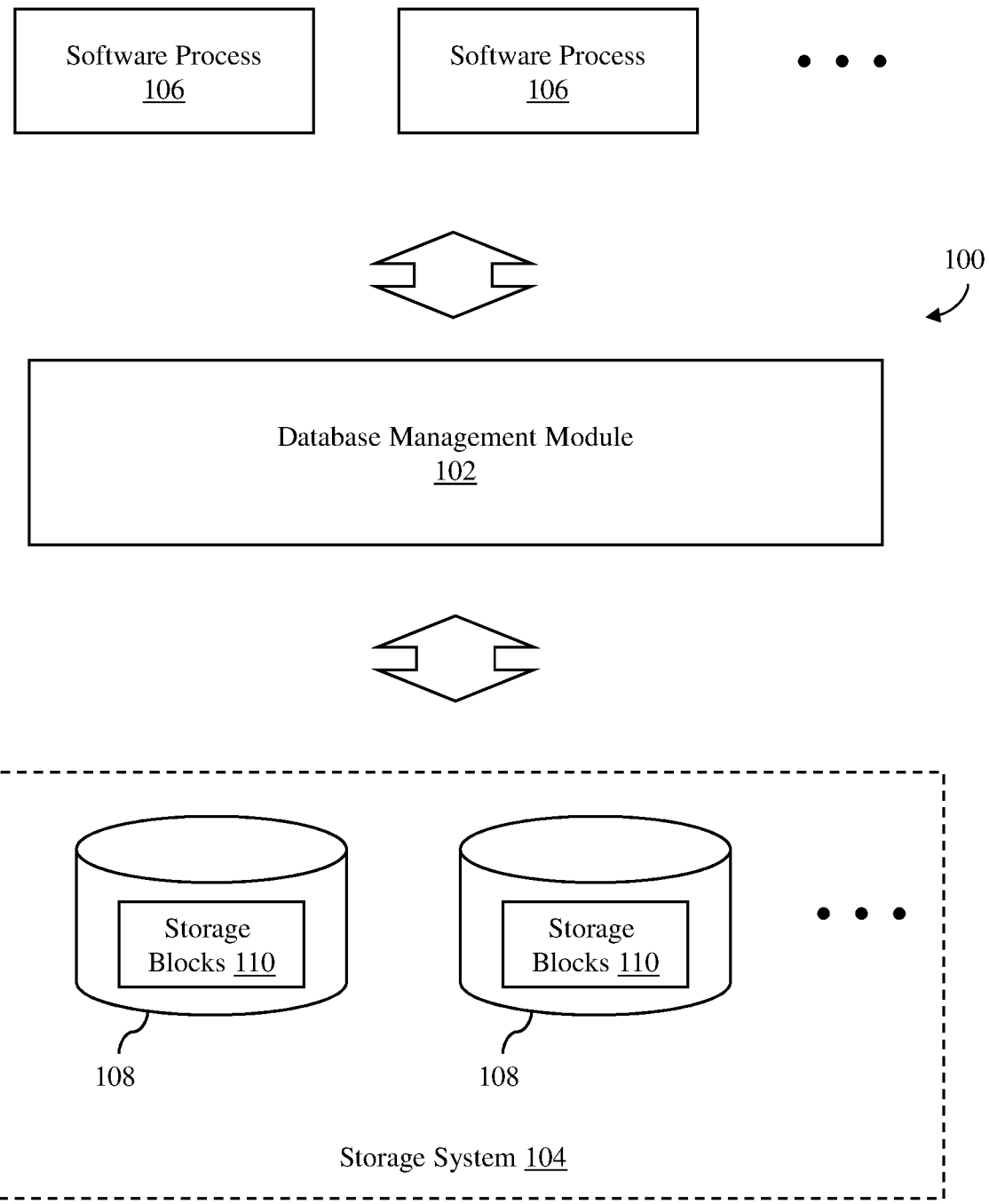
FIG. 1 is a block diagram of a data storage system in accordance with an embodiment of the invention.

FIG. 1 depicts a data storage system 100 in accordance with an embodiment of the invention. As shown in FIG. 1, the data storage system 100 includes a database management module 102 and a storage system 104. The data storage system 100 allows software processes 106 to perform data storage operations, such as writing, reading or deleting data stored in the storage system 104. The data stored in the data storage system 100 can be any type of data, including metadata of stored data. As described in detail below, the data storage system 100 is designed to execute these storage operations using mirrored write ahead logs to ensure high availability.

The software processes 106 can be any software program, applications or software routines that can run on one or more computer systems, which can be physical computers, virtual computers, such as VMware virtual machines, or a distributed computer system. The software processes 106 may initiate various data storage operations, such as read, write, delete and rename operations, for data stored in the storage system 104, which are then executed by the data storage system 100.

The storage system 104 of the data storage system 100 includes one or more computer data storage devices 108, which are used by the data storage system 100 to store data, which may include metadata. The data storage devices 108 can be any type of non-volatile storage devices that are commonly used for data storage. As an example, the data storage devices 108 may be, but not limited to, persistent virtual memory (PVM), non-volatile memory express (NVMe), solid-state devices (SSDs), hard disks or a combination of the four. The storage space provided by the data storage devices 108 may be divided into storage blocks 110, which may be disk blocks, disk sectors or other storage device sectors.

In an embodiment, the storage system 104 may be a local storage system of a computer system supporting the database management module 102, such as a hard drive disk. In another embodiment, the storage system 104 may be a remote storage system that can be accessed via a network, such as a network-attached storage (NAS). In still another embodiment, the storage system 104 may be a distributed storage system such as a storage area network (SAN) or a virtual SAN. Depending on the embodiment, the storage system 104 may include other components commonly found in those types of storage systems, such as network adapters, storage drivers and/or storage management servers. The storage system 104 may be scalable, and thus, the number of data storage devices 108 included in the storage system can be changed as needed to increase or decrease the capacity of the storage system 104 to support increase/decrease in workload. Consequently, the exact number of data storage devices 108 included in the storage system 104 can vary from one to hundreds or more.

The database management module 102 operates to manage data and/or metadata stored in the storage system 104. As used herein, data stored in the storage system 104 may include any type of computer files, and metadata stored in the storage system may include information that describes the stored data with respect to its characteristics and physical storage locations. Thus, the metadata of stored data or "storage metadata" may include file names, file paths, modification dates and permissions. In a distributed file system architecture, the storage metadata may be stored in multiple metadata servers located at different storage locations.

In an embodiment, the database management module 102 may be implemented as software running on one or more computer systems, which can be physical computers, virtual computers, such as VMware virtual machines, or a distributed computer system. However, in other embodiments, the database management module 102 may be implemented in any combination of hardware and software.

If the database management module 102 is used for a file system, the database management module may present data stored in the storage system 104 as one or more file system structures, which include hierarchies of file system objects, such as file system volumes, file directories/folders, and files, for shared use of the file system. Thus, the database management module 102 may organize the storage resources of the storage system 104 into the file system structures so that the software processes 106 can access the file system objects for various file system operations, such as creating file system objects, deleting file system objects, writing or storing file system objects, reading or retrieving file system objects and renaming file system objects.

The database management module 102 stores data in a storage data structure 200 (shown in FIG. 2) in the storage system 104. In an embodiment, the database management module may store data in a copy-on-write (COW) storage data structure, which may include multiple COW indexing data structures, such as COW B-trees. In a particular implementation, the COW storage data structures used by the database management module may include COW $B^\varepsilon$-trees. In other embodiments, the storage data structure may be any type of relational or non-relational database structure.

Figure 2:
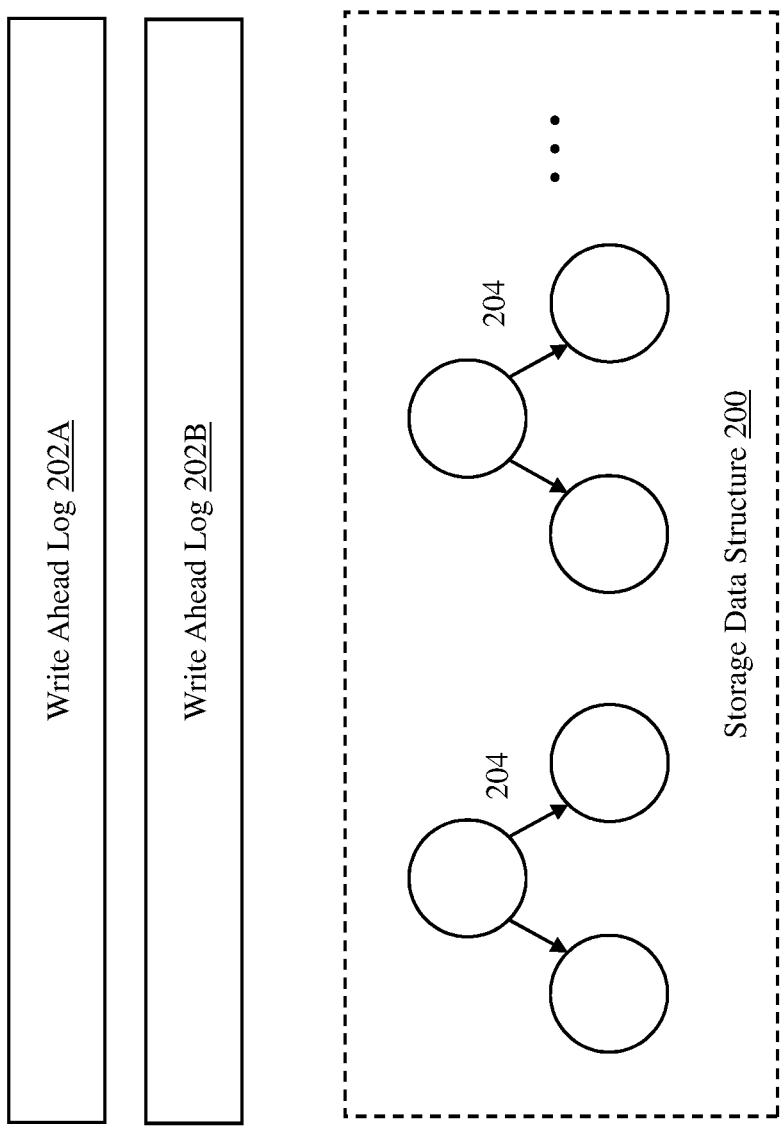
FIG. 2 is a diagram of a storage data structure and mirrored write ahead logs used by the data storage system shown in FIG. 1 in accordance with an embodiment of the invention.

As illustrated in FIG. 2, in order to support operations on the storage data structure 200, the data storage system 100 uses two mirrored write ahead logs 202A and 202B. In the illustrated embodiment, the storage data structure 200 is shown to include a number of COW $B^\varepsilon$-trees 204. However, in other embodiments, the storage data structure 200 may include other indexing data structures. The write ahead logs 202A and 202B are data structures that are used by the database management module 102 to maintain a log of individual transaction requests in the order that the transaction requests were received. Each transaction request may include at least a log number and the transaction type, e.g., insert and delete for data stored in the storage data structure 200. In addition to transaction requests, the write ahead logs may also be used to maintain checkpointing information to indicate the transaction requests that were received before and after certain checkpoints. Checkpointing is a process where data modifications corresponding to the transaction requests that were received after the previous checkpoint are executed on the storage system 104, e.g., written to one or more storage disks in the storage system. In one implementation, the checkpoint information is stored in the write ahead logs as generation start and end indicators. A particular checkpoint generation is defined by a checkpoint generation start indicator and a corresponding checkpoint generation end indicator. A checkpoint generation end indicator is immediately followed by a new checkpoint generation start indicator in the write ahead logs. In an embodiment, each checkpoint generation start or end indicator may include a checkpoint generation identifier, which may be a numerical value, and an end or start indicator, which may be represented by a particular bit.

The mirrored write ahead logs 202A and 202B are persistently stored in the storage system 104 so that some of the previous transaction requests are not lost when a failure, such as a system crash, occurs. The write ahead logs may be stored at different locations/disks/controllers/hosts on the storage system to reduce the possibility of losing both write ahead logs due to hardware and/or software failure. In an embodiment, one of the two mirrored write ahead logs may be stored on one storage device 108 of the storage system 104 and the other write ahead logs may be stored on another storage device of the storage system. In other embodiments, one of the two mirrored write ahead logs may be stored at a first location of a storage device of the storage system, e.g., one sector of a storage disk, and the other write ahead logs may be stored at a second location of the same storage device, e.g., another sector of the same storage disk.

The mirrored write ahead logs 202A and 202B are maintained by the database management module 102 so that entries in both write ahead logs are the same. In an embodiment, transaction requests are written in parallel to both mirrored write ahead logs using a two-phase commit protocol. The database management module batches transaction requests from sources, e.g., the software processes 106, into groups to be written into the mirrored write ahead logs. The transaction requests may be batched into groups that fit the logical page size. Each group of transaction requests are written in parallel to both write ahead logs 202A and 202B. Only when both writes have been successfully completed, the database management module sends an acknowledgment message back to the requesting software process to ensure durability. Similar protocol can be used even if checkpointing entries are written into the write ahead logs.

Figure 3:
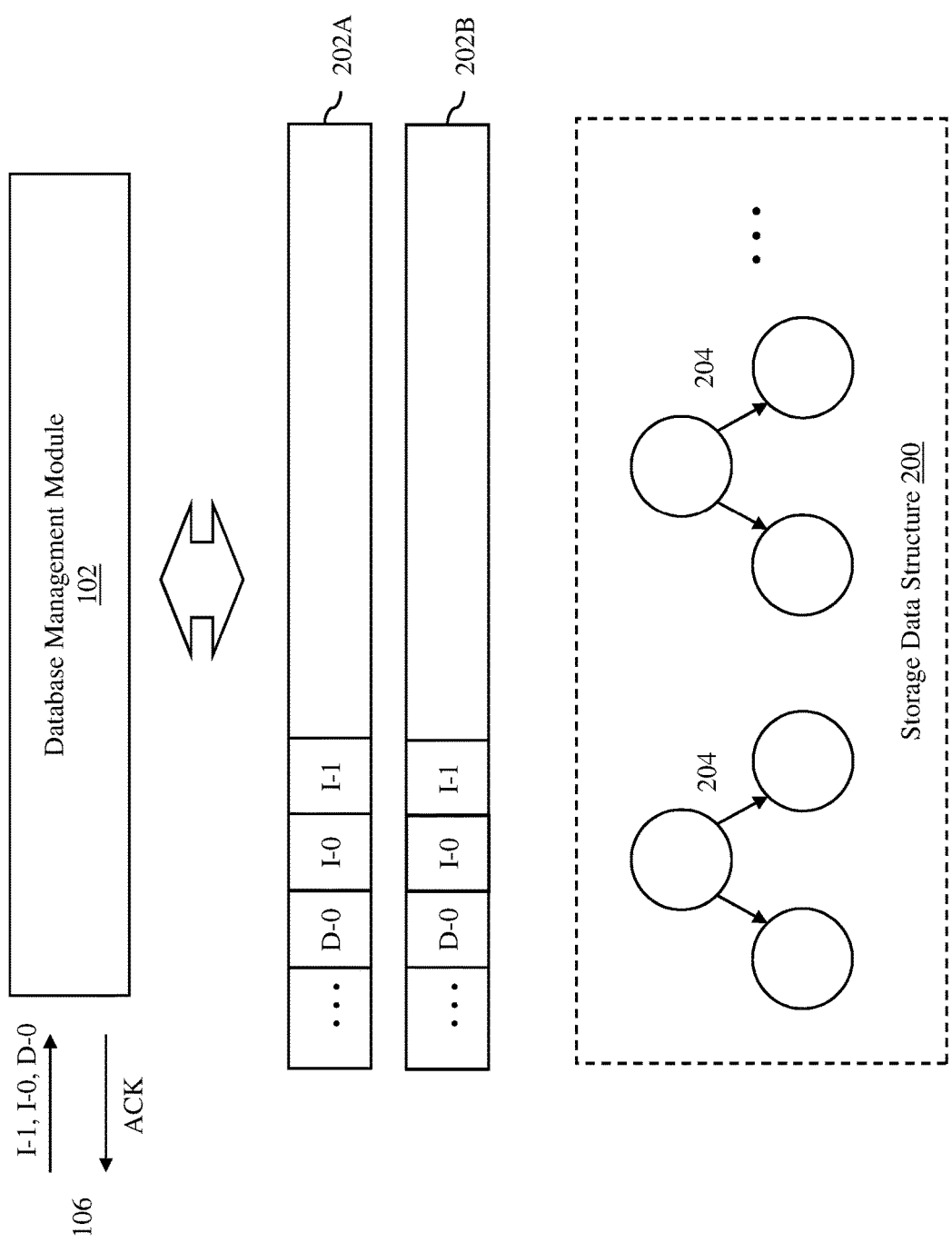
FIG. 3 illustrates transaction requests being written to the mirrored write ahead logs in accordance with an embodiment of the invention.

An example of writing to both write ahead logs 202A and 202B is illustrated in FIG. 3. In the example shown in FIG. 3, a deletion transaction request D-0 and insertion requests I-0 and I-1 from the software processes 106 are received by the database management module 102 to be processed. This group of transaction requests is then written to the write ahead logs 202A and 202B in parallel by the database management module in the order the transaction requests were received. After the group of transaction requests is written to both write ahead logs, acknowledgment messages are sent back to the software processes 106 to complete the two-phase commit process.

Although there are two mirrored write ahead logs 202A and 202B, only one of the two mirrored write ahead logs is actively used by the database management module 102 to execute the transaction requests that have been written to both write ahead logs. The write ahead log that is currently being used by the database management module will sometimes be referred to herein as the active write ahead log, while the other write ahead will sometimes be referred to herein as the standby write ahead log. As the transaction requests in the write ahead logs are executed and additional transaction requests are written into the write ahead logs, executed transaction requests in the write ahead logs may be deleted to make space in the write ahead logs for further transaction requests. The write ahead logs may use a first-in first-out protocol so that the older entries are deleted first. The executed transaction requests may be deleted from the write ahead logs by the database management module when a predefined amount of log entries have been written into the write ahead logs. As an example, when the percentage of used space of the write ahead logs has exceeded a threshold, e.g., 90%, the oldest or earliest log entries in the write ahead logs may be deleted. As another example, when the number of log entries written into the write ahead logs exceeds a threshold, e.g., 10,000 entries, the oldest log entries in the write ahead logs may be deleted. The executed transaction requests may be deleted individually or in batches. In an embodiment, the executed transaction requests that have been checkpointed together may be deleted as a batch.

If one of the write ahead log 202A and 202B that is currently functioning as the active write ahead log fails, then the other write ahead log is designated as the new active write ahead log by the database management module 102 and used by the database management module to continue the operation of the data storage system 100. However, if one of the write ahead log 202A and 202B that is currently functioning as the standby write ahead log fails, the current active write ahead log continues to support the operation of the data storage system 100 without any change. A new write ahead log is then created by the database management module and populated with the log entries to mirror the existing write ahead log, which can be either the new active write ahead log or the existing active ahead log. The newly created write ahead log is then used as a standby write ahead log for the data storage system 100.

Figure 4A:
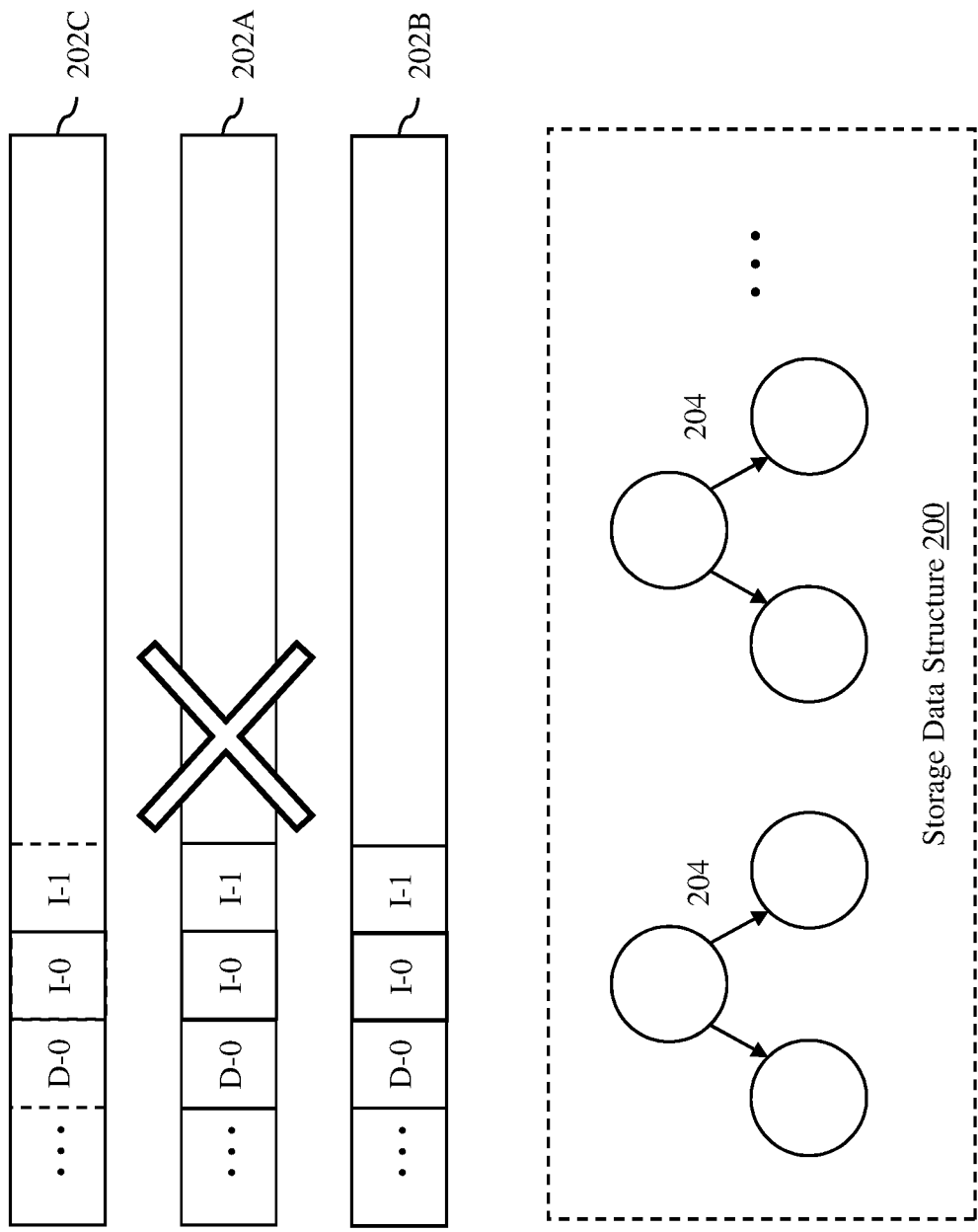
FIG. 4A illustrates an active write ahead log failure in accordance with an embodiment of the invention.

An example of an active write ahead log failure is illustrated in FIG. 4A. In the example shown in FIG. 4A, the write ahead log 202A is the active write ahead log that is being used by the database management module 102 to execute the logged transaction requests, and the write ahead log 202B is the standby write ahead. When the active write ahead log 202A fails, the standby write ahead log 202B takes over as the new active write ahead log. In addition, a new standby write ahead log 202C is created by the database management module, which will be populated with log entries to mirror the new active write ahead log 202B.

Figure 4B:
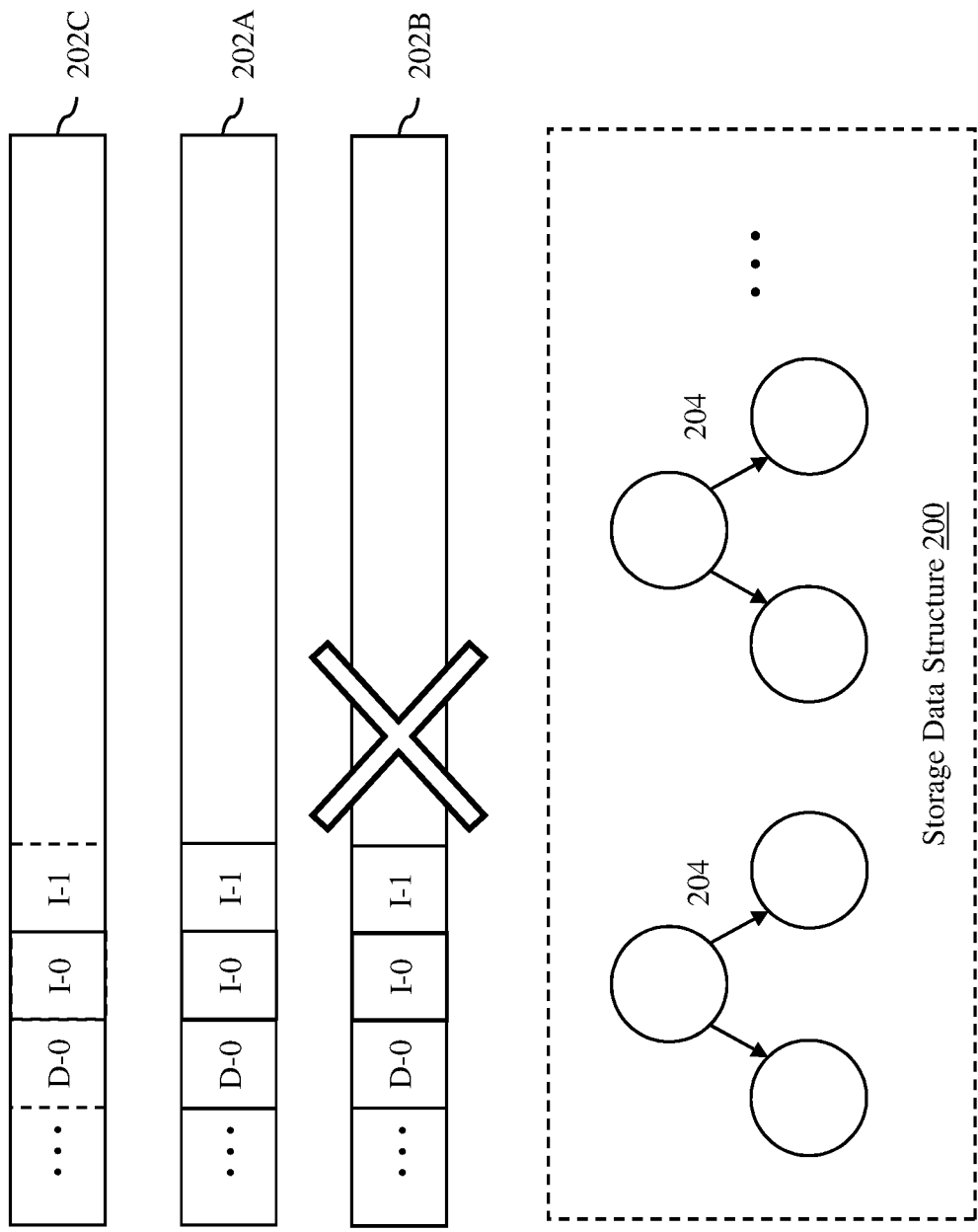
FIG. 4B illustrates a standby write ahead log failure in accordance with an embodiment of the invention.

An example of a standby write ahead log failure is illustrated in FIG. 4B. Similar to the example shown in FIG. 4A, in the example shown in FIG. 4B, the write ahead log 202A is the active write ahead log that is being used by the database management module 102 to execute the logged transaction requests, and the write ahead log 202B is the standby write ahead log. When the standby write ahead log 202B fails, the active write ahead log 202A continues to function as the active write ahead log. In addition, a new standby write ahead log 202C is created by the database management module, which will be populated with log entries to mirror the active write ahead log 202A.

A failure of one of the write ahead log 202A and 202B may be detected by the database management module 102 using a known technique. As an example, the database management module may detect a write ahead log failure when a data writing error is detected for one of the write ahead logs after a predefined number of repeated attempts to write data into that write ahead log. As another example, the database management module may detect a write ahead log failure when a notification is received from the computer system supporting the database management module that the storage device, e.g., a hard disk, on which one of the write ahead logs is stored is undetectable or not recognized.

When a new replacement standby write ahead log is created, the new write ahead log is populated with the log entries of the other existing write ahead log so that both write ahead logs have the same log entries. In some embodiments, any new log entries to be written to the write ahead logs are still written to the new standby write ahead log, as well as the active write ahead log. In addition, existing log entries in the active write ahead log are copied to the new standby write ahead log until both write ahead logs contain the same log entries.

In an embodiment, the existing logs in the active write ahead log are copied to the new standby write ahead log in a last-in first-copied process, which begins with the latest log entry stored in the active write ahead log, followed by the next latest log entry stored in the active write ahead log, until the earliest log entry in the active write ahead log. Since existing logs in the active write ahead logs are continuously being expelled from the active write ahead log as new log entries are written into the active write ahead log, copying the later or newer log entries in the active write ahead log to the new standby write ahead log first will more efficiently replicate the log entries in the active write ahead logs to the new standby write ahead log.

Figure 5A:
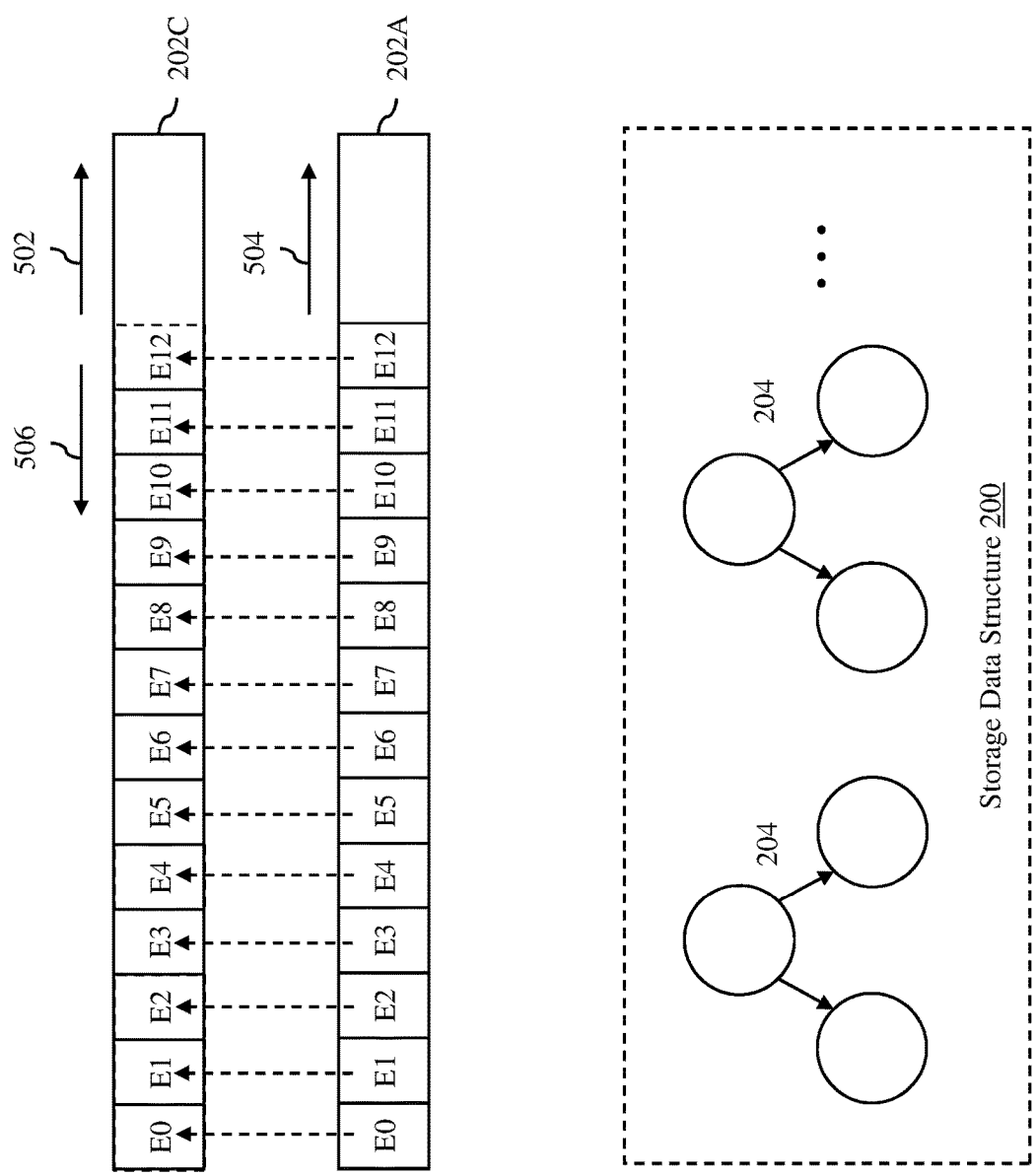
FIG. 5A illustrates a last-in first-copied process for populating a new replacement standby write ahead log in accordance with an embodiment of the invention.

An example of the last-in first-copied process for populating a replacement standby write ahead log in accordance with an embodiment of the invention is illustrated in FIG. 5A. In the example shown in FIG. 5A, the write ahead log 202A is the active write ahead log and the write ahead log 202C is the newly created standby write ahead log. Existing log entries E0-E12 in the active write ahead log 202A are arranged oldest log entry E0 to the latest log entry E12 from left to right. New log entries are written to both write ahead logs 202A and 202C in parallel in the manner described above, as illustrated by arrows 502 and 504. The existing log entries of the active write ahead log 202A are copied to the new standby write ahead log 202C from right to left, starting with the latest log entry E12, then the next latest log entry E11 and so on, as illustrated by arrow 506.

In another embodiment, the existing logs in the active write ahead log are copied to the new standby write ahead log in groups beginning with the group of latest log entries stored in the active write ahead log, followed by the group of next latest log entries stored in the active write ahead log until the group of earliest log entry in the active write ahead log. In this embodiment, for each group of log entries stored in the active write ahead log being copied, the log entries may be copied from the oldest log entry to the newest log entry in that group of log entries. The groups may represent different checkpointing processes so that each group includes log entries for a particular checkpointing process.

Figure 5B:
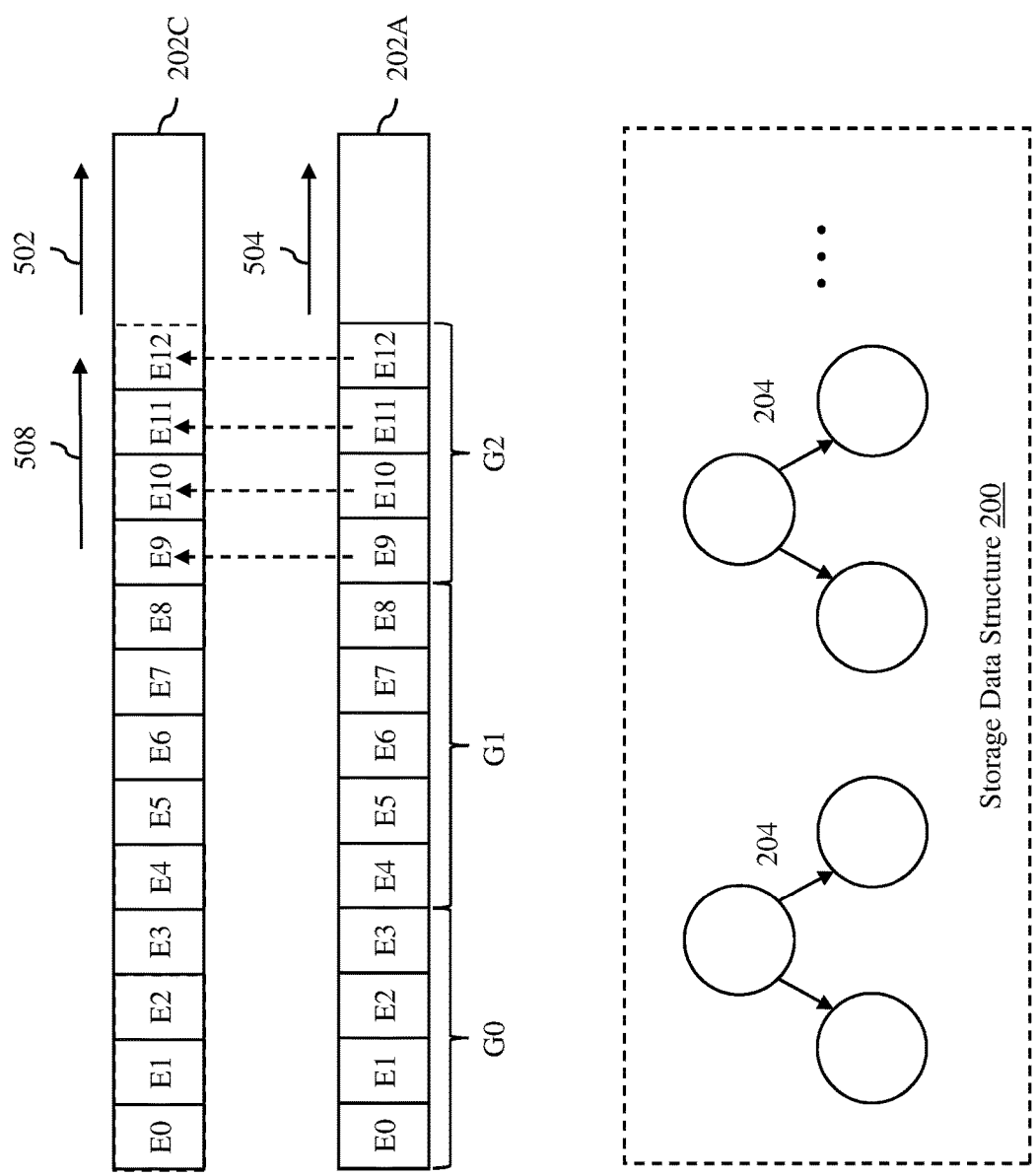
FIG. 5B illustrates a group copying process for populating a new replacement standby write ahead log in accordance with an embodiment of the invention.

An example of the group copying process for populating a replacement standby write ahead log in accordance with an embodiment of the invention is illustrated in FIG. 5B. Similar to the example shown in FIG. 5A, in the example shown in FIG. 5B, the write ahead log 202A is the active write ahead log and the write ahead log 202C is the newly created standby write ahead log. The existing log entries E0-E12 in the active write ahead log 202A are arranged oldest to the latest from left to right. In addition, the existing log entries in the active write ahead log 202A are defined by groups G0-G2. In this example, each of these group include log entries for a particular checkpointing process. Thus, log entries E0-E3 belong to one checkpointing process, log entries E4-E8 belong to another checkpointing process, and log entries E9-E12 belong to still another checkpointing process. Again, new log entries are written to both write ahead logs 202A and 202C in parallel in the manner described above, as illustrated by the arrows 502 and 504. The existing log entries of the active write ahead log 202A are copied to the new standby write ahead log 202C in groups from right to left, starting with the group G2, which includes the latest log entries. In FIG. 5B, the existing log entries of the group G2 in the write ahead log 202A are being copied to the write ahead log 202C from the earliest log entry, i.e., the log entry E9, to the latest log entry, i.e., the log entry E12, in the group G2, as illustrated by an arrow 508.

Figure 6:
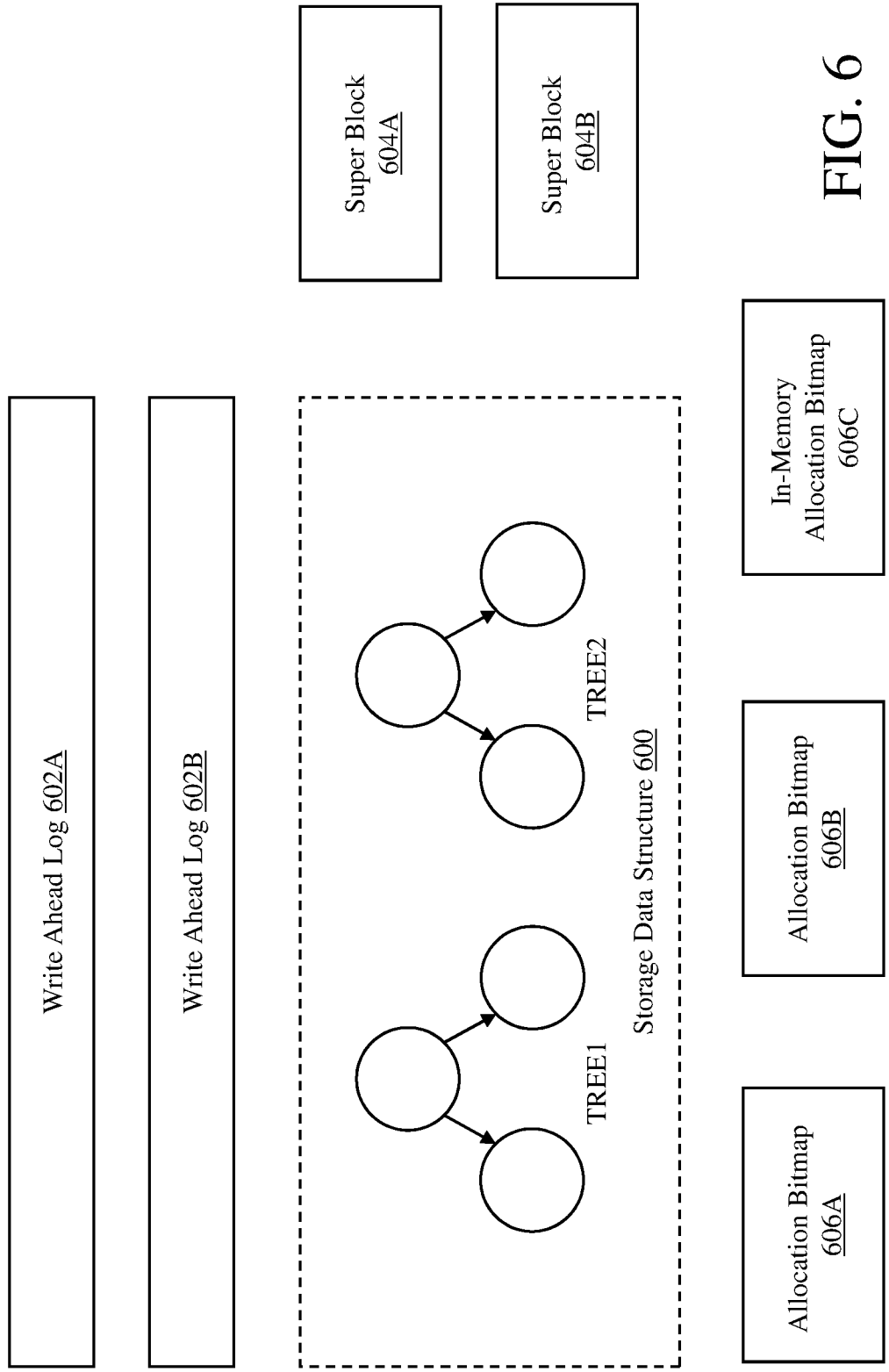
FIG. 6 is a block diagram of data structures used by the data storage system in accordance with one implementation.

In a particular implementation, in order to support operations on a storage data structure 600, the data storage system 100 uses mirrored write ahead logs 602A and 602B with a pair of super blocks 604A and 604B and multiple allocation bitmaps 606A, 606B and 606C, as illustrated in FIG. 6. In this implementation, the storage data structure 600 includes multiple COW $B^\varepsilon$-trees, e.g., COW $B^\varepsilon$-trees TREE1 and TREE2. Although the storage data structure 600 is shown with only two COW $B^\varepsilon$-trees in FIG. 6, the storage data structure may support many more COW $B^\varepsilon$-trees. In other implementations, the storage data structure 600 may include other types of COW indexing data structures, such as COW B-trees. As explained in detail below, the database management module 102 manages the storage data structure 600 using the mirrored write ahead logs 602A and 602B, the super blocks 604A and 604B and the allocation bitmaps 606A, 606B and 606C to ensure atomicity and durability with respect to processing data storage operations on the storage data structure 600.

The mirrored write ahead logs 602A and 602B are data structures that are used as the active and standby write ahead logs by the database management module 102 to maintain a log of individual transaction requests in the order that the transaction requests were received. Each transaction request may include at least a log number and the transaction type, e.g., insert and delete for data stored in the COW $B^\varepsilon$-trees of the storage data structure 600. In addition to transaction requests, the mirrored write ahead logs are also used to maintain checkpointing information to indicate the transaction requests that were received before and after certain checkpoints. In this implementation, the checkpoint information is stored in the mirrored write ahead logs as checkpoint generation start and end indicators. A particular checkpoint generation is defined by a checkpoint generation start indicator and a corresponding checkpoint generation end indicator. A checkpoint generation end indicator is immediately followed by a new generation start indicator in the write ahead log. Each checkpoint generation start/end indicator may include a checkpoint generation identifier, which may be a numerical value, and an end or start indicator, which may be represented by a particular bit.

The super blocks 604A and 604B are data structures that are used by the database management module 102 to record references to the storage data structure 600 at a particular state of the storage data structure when a particular checkpointing process was completed. Thus, using these references stored in the super blocks 604A and 604B, the storage data structure 600 at a desired state can be accessed for recovery after a failure. In some embodiments, the references recorded in the super blocks 604A and 604B are pointers to central or first nodes of indexing data structures of the storage data structure 600, which are stored with a checkpoint generation identifier. The checkpoint generation identifier, which may be a checkpoint generation number, indicates the checkpoint generation that was successfully completed. In embodiments where the indexing data structures are B-trees, the references may be references to the appropriate root nodes of the B-trees after completion of a particular checkpoint generation. The appropriate root nodes of the B-trees after completion of a particular checkpoint generation are the latest root nodes of the B-trees after completion of that checkpoint generation, which includes root nodes that were copied and modified due to the checkpointing process. The references to the root nodes of B-trees of the storage data structure 600 may include storage offsets of where the root nodes are stored in the storage system 104. In some embodiments, the super blocks 604A and 604B may also include checksums to ensure validity of the information stored therein.

The super blocks 604A and 604B may store the references to the storage data structure 600 in any data structure configuration. As an example, the super blocks 604A and 604B may be configured as tree data structures, such as B-trees.

The super blocks 604A and 604B may be stored at different locations on the storage system 104 to reduce the possibility of losing both super blocks due to hardware and/or software failure. In an embodiment, one of the two super blocks 604A and 604B may be stored on one storage device 108 of the storage system 104 and the other super block may be stored on another storage device of the storage system. In other embodiments, one of the two super blocks may be stored at a first location of a storage device of the storage system 104, e.g., one sector of a storage disk, and the other super block may be stored at a second location of the same storage device, e.g., another sector of the same storage disk.

In operation, when current references to the storage data structure 600, including any new references, are needed to be recorded for a particular checkpoint generation, only one of two existing super blocks 604A and 604B is updated to record the references with a checkpoint generation identifier. The updated super block is then subsequently used to record current references to the storage data structure 600 with the next checkpoint generation identifier. In an embodiment, when current references to the storage data structure 600 are needed to be recorded for a particular checkpoint generation, one of the existing super blocks 604A and 604B at a first storage location in the storage system 104 is first copied and modified in memory with the references and the corresponding checkpoint generation identifier, and then the modified super block is placed in a second or alternate storage location in the storage system, replacing the previous super block at the alternate location with the modified super block. However, the super block at the first storage location in the storage system is not modified. When current references to the storage data structure 600 are needed to be recorded for the next checkpoint generation, the most recently updated super block, i.e., the super block at the second storage location, is used to update the super block at the first storage location. Thus, in this embodiment, the selection of a super block to be updated is successively switched between the two super blocks.

The allocation bitmaps 606A, 606B and 606C are data structures that are used to indicate whether units of storage spaces in the storage system 104 have been allocated or not allocated. A unit of storage space can be any predefined size of storage that can be used to store data, such as data for the storage data structure 600. As an example, a unit of storage space can be a storage block of 4096 bytes. A storage space unit is allocated if that storage space unit has been assigned to be written with data, which is typically represented by a "1" bit in an allocation bitmap. A storage space unit is not allocated if that storage space unit is available, or free to be assigned or allocated, which is typically represented by a "0" bit in an allocation bitmap.

As illustrated in FIG. 6, there are three allocation bitmaps 606A, 606B and 606C used in the data storage system 100 to manage allocation/availability of storage space units in the storage system 104. The two allocation bitmaps 606A and 606B are persistently stored in the storage system 104, e.g., on one or more storage disks, and the allocation bitmap 606C is stored in memory. The in-memory allocation bitmap 606C is used to mark or record the latest allocations, which is then used to update one of the two allocation bitmaps 606A and 606B stored in the storage system 104, which may be stored in different storage devices or storage sectors in the storage system. Thus, at least one of the two allocation bitmaps 606A and 606B stored in the storage system 104 is synchronized with the in-memory allocation bitmap 606C with the latest allocation information, which can be used in the event of crash or other failures.

Figure 7:
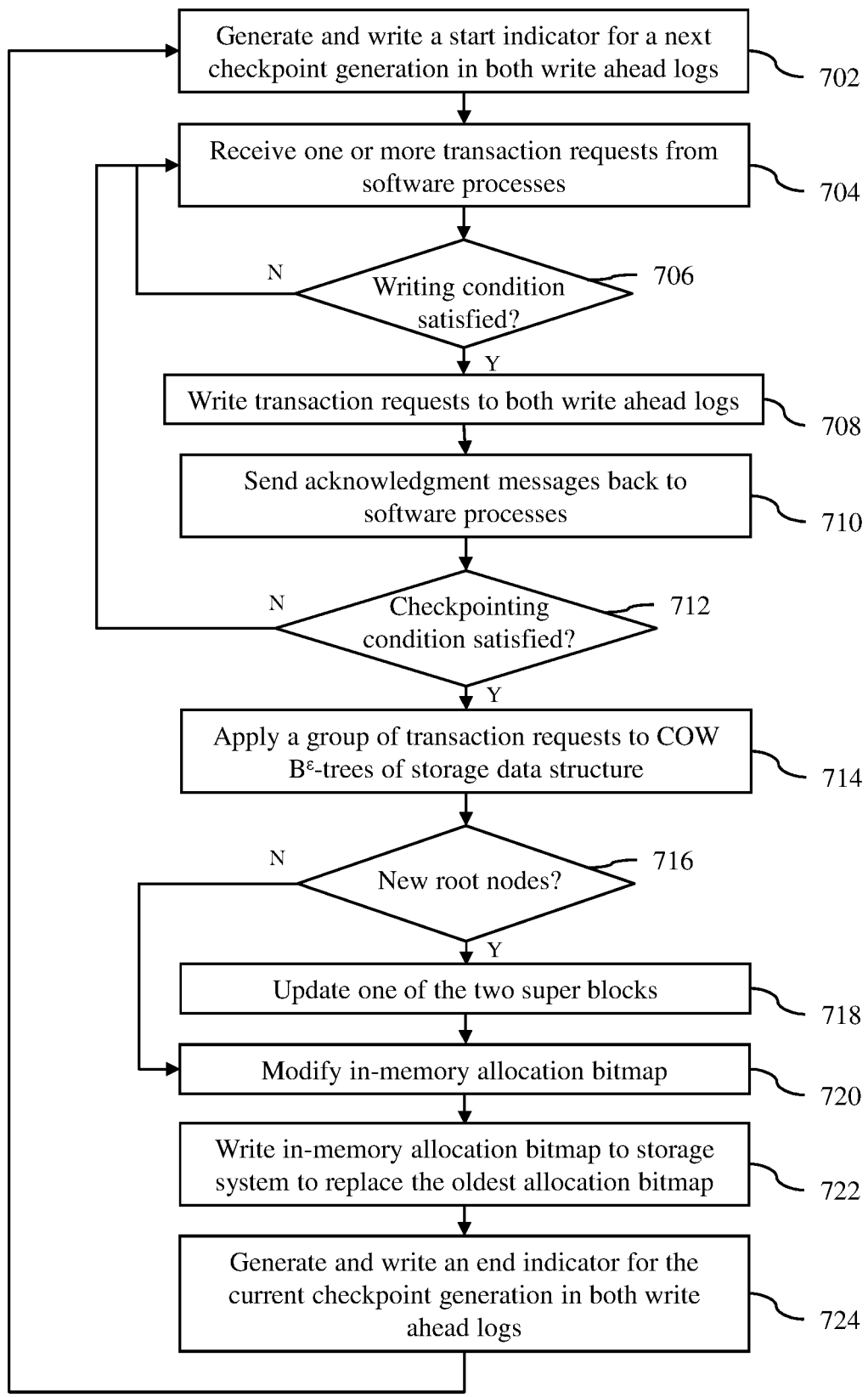
FIG. 7 is a process flow diagram of the transaction processing operation of the data storage system in accordance with an embodiment of the invention.

The transaction processing operation of the data storage system 100 using a pair of mirrored write ahead logs in accordance with an embodiment of the invention will now be described with reference to a flow diagram of FIG. 7 using the embodiment illustrated in FIG. 6. In this example, it is assumed that the write ahead log 602A is the active write ahead log and the write ahead log 602B is the standby write ahead log. Turning now to FIG. 7, at block 702, a start indicator for the next checkpoint generation is generated and written in both write ahead logs 602A and 602B in parallel by the database management module 102. A checkpoint generation defines a period of time when transaction requests to the data storage system 100 are recorded in the write ahead logs before being implemented. The execution of the transaction requests is performed using the log entries in the active write ahead log, which in the example is the write ahead log 602A.

Next, at block 704, one or more transaction requests from the software processes 106 are received by the database management module 102 to be processed. Next, at block 706, a determination is made by the database management module 102 whether a condition for writing the transaction requests to the mirrored write ahead logs 602A and 602B is satisfied. This condition may be satisfied when a group of transaction requests have been received by the database management module 102. Alternatively, the condition may be satisfied when a certain timeout has occurred, i.e., a prescribed amount of time has passed since the last transaction request was received by the database management module 102.

If the writing condition is not satisfied, the operation proceeds back to block 704, where additional transaction requests from the software processes 106 may be received by the database management module 102 to be processed until the condition is satisfied.

If the writing condition is satisfied, the operation proceeds to block 708, where the transaction requests are written to both write ahead logs 602A and 602B in parallel in the order the transaction requests were received. Next, at block 710, messages are sent back to the software processes 106 to acknowledge that the transaction requests were received.

Next, at block 712, a determination is made whether a condition to initiate checkpointing is satisfied. This condition may be satisfied when the number of transaction requests in the mirrored write ahead logs 602A and 602B exceeds a predefined threshold, which indicates that the write ahead logs are sufficiently full. Alternatively, the condition may be satisfied when a predefined timeout has occurred, i.e., certain amount of time has passed since the completion of the last checkpointing process.

If the checkpointing condition is not satisfied, the operation proceeds back to block 704, where additional transaction requests from the software processes 106 may be received by the database management module 102 to be processed until the checkpointing condition is satisfied.

If the checkpointing condition is satisfied, the operation proceeds to block 714, where a group of transaction requests in the active write ahead log 602A that were written after the start indicator of the current checkpoint generation are applied to the COW $B^\varepsilon$-trees of the storage data structure 600 by the database management module 102. In an embodiment, the database management module 102 uses memory to make changes to the storage data structure 600. After the changes are made, a flushing process is initiated by the database management module 102, which copy-on-writes all dirty pages during the flushing process. As a result, a copy of one or more root nodes of COW $B^\varepsilon$-trees of the storage data structure 600 may be created and modified accordingly.

Next, at block 716, a determination is made by the database management module 102 whether one or more new root nodes have been created for the COW $B^\varepsilon$-trees of the storage data structure 600 due to the transaction requests in the active write ahead log 602A being applied to the storage data structure.

If one or more new root nodes have not been created for the COW $B^\varepsilon$-trees of the storage data structure 600, the operation proceeds to block 720.

If one or more new root nodes have been created for the COW $B^\varepsilon$-trees of the storage data structure 600, the operation proceeds to block 718, where one of the super blocks 604A and 604B is updated with references to the new root nodes of the COW $B^\varepsilon$-trees of the storage data structure 600 by the database management module 102. In addition, an identifier for the current checkpoint generation is added to the updated super block by the database management module 102. A checksum may also be computed and added to the updated super block by the database management module 102. In an embodiment, the most recently updated super block at a first storage location in the storage system 104 is used to make changes in memory to reflect any reference changes to the root nodes of the COW $B^\varepsilon$-trees of the storage data structure 600. The modified super block in memory is then used to replace the other super block at a second storage location in the storage system 104. When the super blocks need to be updated again during a subsequent checkpointing process, the super block at the second storage location, which would now be the most recently updated super block, is used to make changes to replace the super block at the first storage location. In this fashion, the two super blocks 604A and 604B are updated in an alternating manner.

Next, at block 720, the in-memory allocation bitmap 606C is modified by the database management module 102 to reflect changes in storage allocations due to the transaction requests that are being checkpointed, such as allocating new blocks or freeing previously allocated blocks in the storage system 104. In addition, the current checkpoint generation identifier is added to the in-memory allocation bitmap 606C.

Next, at block 722, the modified in-memory allocation bitmap 606C is written to the storage system 104, e.g., on disk, by the database management module 102 to replace the oldest allocation bitmap from the two allocation bitmaps 606A and 606B in the storage system. In an embodiment, the oldest allocation bitmap selected from the two allocation bitmaps 606A and 606B may be overwritten with the modified in-memory allocation bitmap 606C. For the next checkpointing process, the other allocation bitmap stored in the storage system 104 will be overwritten with the in-memory allocation bitmap 606C. Thus, the two allocation bitmaps 606A and 606B in the storage system 104 are updated in an alternating fashion for successive checkpointing processes.

Next, at block 724, an end indicator for the current checkpoint generation is generated and written in the mirrored write ahead logs 602A and 602B to indicate that the storage data structure 600, the super blocks 604A and 604B and the allocation bitmaps 606A and 606B have been updated. Thus, the end indicator for a particular checkpoint generation in each of the mirrored write ahead logs shows that the checkpointing process for that particular checkpoint generation has been properly completed.

The operation then proceeds back to block 702, where a start indicator for the next checkpoint generation is written to the mirrored write ahead logs 602A and 602B to indicate the start of a new checkpoint generation. In one embodiment, the start indicator for the next checkpoint is written together with the end indicator of the previous checkpoint to reduce the number of I/Os to the mirrored write ahead logs. The use of the mirrored write ahead logs 602A and 602B, the super blocks 604A and 604B and the allocation bitmaps 606A and 606B allows the storage data system 100 to properly recover from a failure so that operations executed or being executed at the time of the failure are reflected in the storage data system after the recovery.

Figure 8:
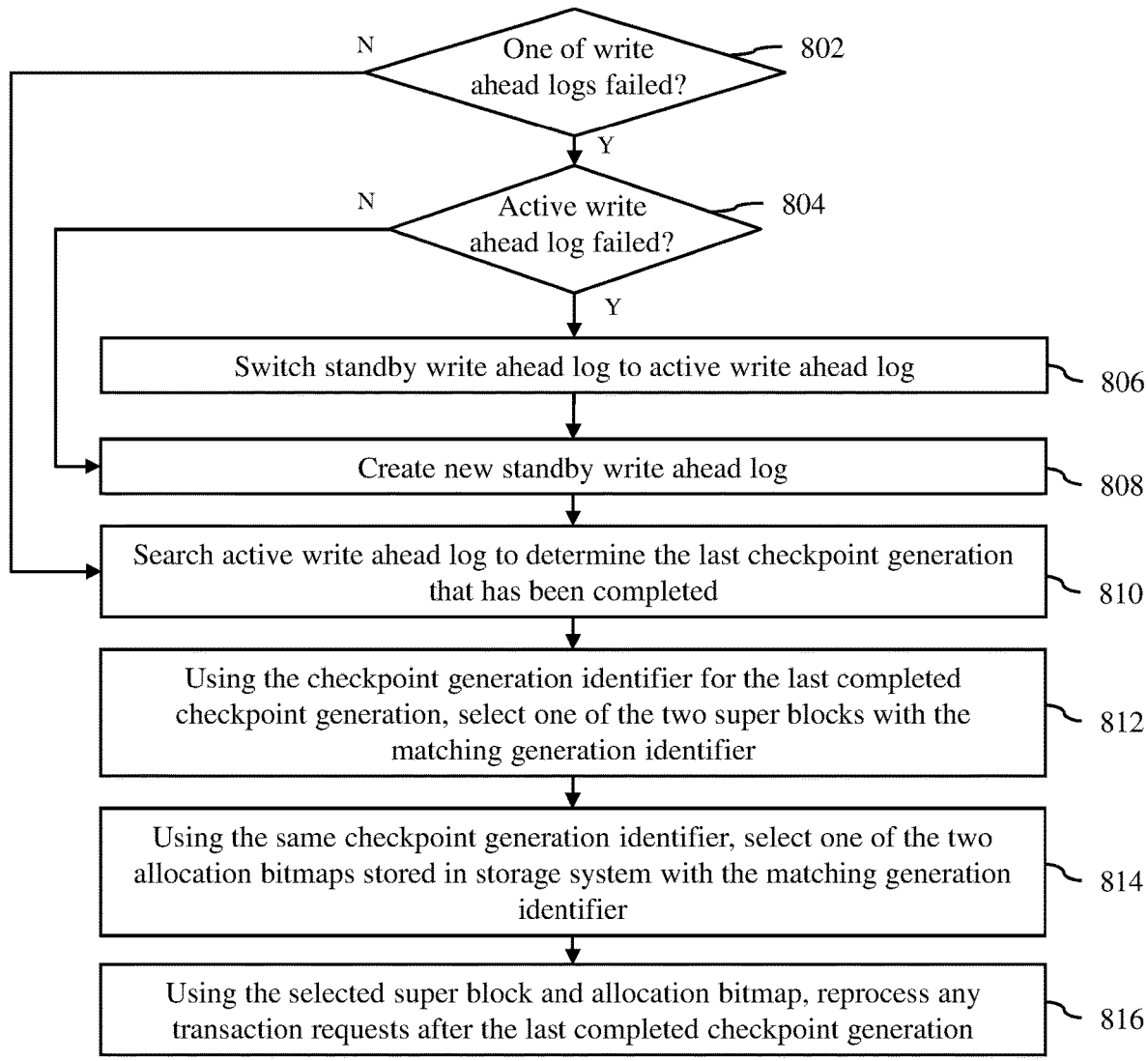
FIG. 8 is a process flow diagram of the recovery operation of the data storage system in accordance with an embodiment of the invention.

The recovery operation of the data storage system 100 in the event of a failure in accordance with an embodiment of the invention will now be described with reference to a flow diagram of FIG. 8 using the embodiment illustrated in FIG. 6. At block 802, after a failure event, e.g., a system crash, or one or more storage disk failures, a determination is made by the database management module 102 whether one of the mirrored write ahead logs 602A and 602B has failed. If one of the mirrored write ahead logs has not failed, the operation proceeds to block 810. However, if one of the mirrored write ahead logs has failed, the operation proceeds to block 804, where a determination is made by the database management module 102 whether the failed write ahead log was the active write ahead log or the standby write ahead log for the data storage system.

If the active write ahead log has failed, the operation proceeds to block 806, where the standby write ahead log, e.g., the write ahead log 602B, is switched to function as the new the active write ahead log by the database management module 102. The operation then proceeds to block 808. However, if the standby write ahead log has failed, the operation directly proceeds to block 808.

At block 808, a new standby write ahead log is created by the database management module 102 to replace the failed write ahead log. In addition, the new standby write ahead log is populated with log entries so that the new standby write ahead log has the same log entries as the current active write ahead log. This process is described in detail below with respect to FIG. 9.

Next, at block 810, the current active write ahead log is searched by the database management module 102 to determine the last checkpoint generation that has been completed. A checkpoint generation has been completed if there is an end indicator for that checkpoint generation. Thus, in an embodiment, the database management module 102 will search through the active write ahead log to find the most recent end indicator for a checkpoint generation in the active write ahead log.

Next, at block 812, using the checkpoint generation identifier for the last completed checkpoint generation, one of the super blocks 604A and 604B with the matching generation identifier is selected by the database management module 102.

Next, at block 814, using the same checkpoint generation identifier, one of the allocation bitmaps 606A and 606B stored in the storage system 104 with the matching generation identifier is selected by the database management module 102.

Next, at block 816, using the selected super block and allocation bitmap, any transaction requests after the last completed checkpoint generation are reprocessed by the database management module 102. The reprocessing of transaction requests may involve undoing incomplete transaction requests and then processing those transaction requests as if the transaction requests are new transaction requests. This ensures that the state of the storage data structure 600, the mirrored write ahead logs 602A and 602B, the super blocks 604A and 604B and the allocation bitmaps 606A and 606B is restored as close as possible to the moment of the failure event.

However, if a super block is selected that has been updated for a previous completed checkpoint generation, all transactions after that previous completed checkpoint generation are reprocessed.

Figure 9:
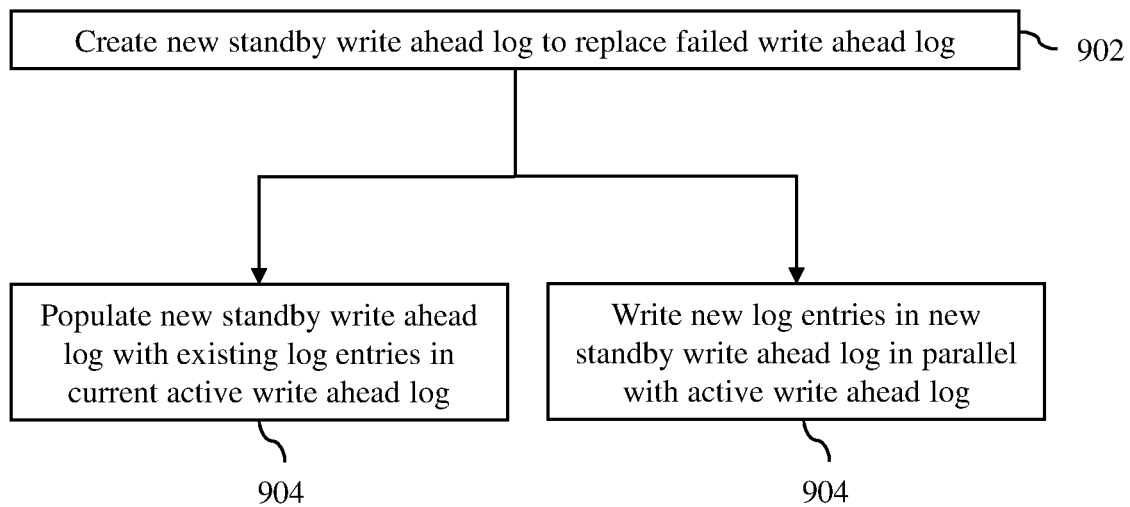
FIG. 9 is a process flow diagram of the write ahead log replacement operation of the data storage system in accordance with an embodiment of the invention.
Figure 10A:
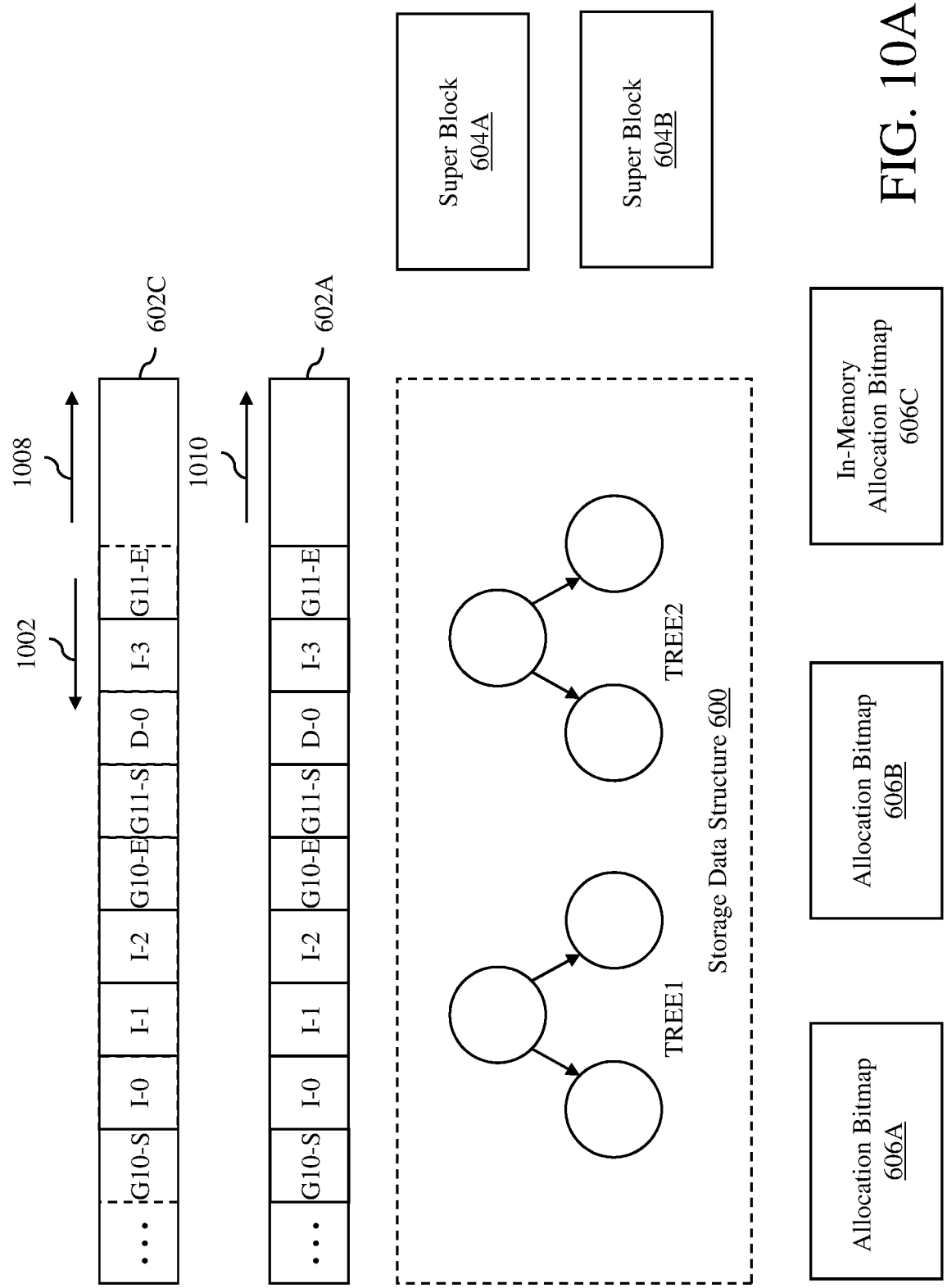
FIG. 10A shows an example of a log entry copying process to populate a new standby write ahead log in accordance with an embodiment of the invention.
Figure 10B:
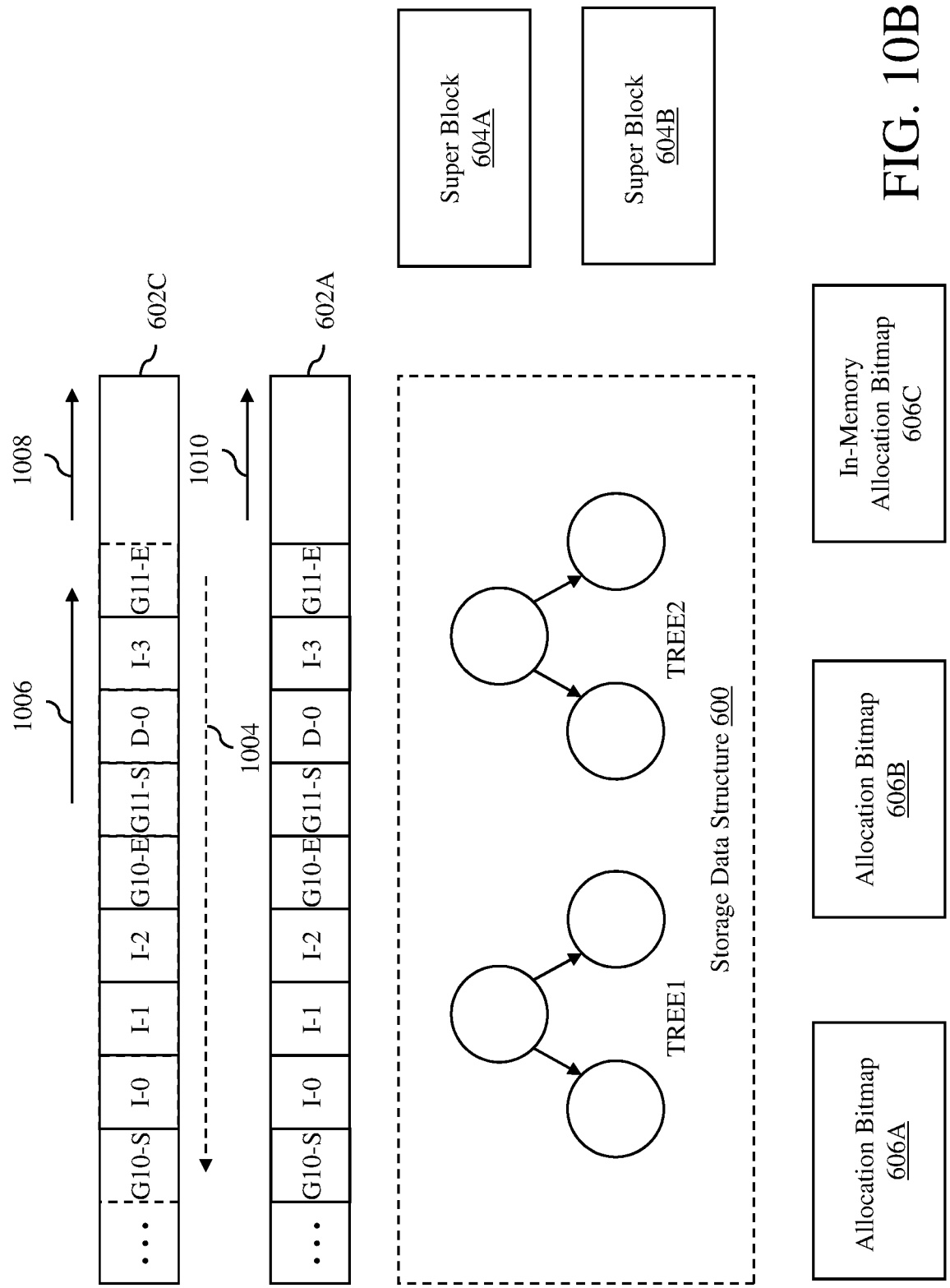
FIG. 10B shows another example of a log entry copying process to populate a new standby write ahead log in accordance with an embodiment of the invention.

The write ahead log replacement operation of the data storage system 100 in the event of a write ahead log failure in accordance with an embodiment of the invention will now be described with reference to a flow diagram of FIG. 9 using examples illustrated in FIGS. 10A and 10B.

At block 902, after one of the mirrored write ahead logs 602A and 602B has failed, a new standby write ahead log is created by the database management module 102 to replace the failed write ahead log. If the failed write ahead log was the active write ahead log for the data storage system 100, then the other write ahead log, which was the standby write ahead log for the data storage system, is switched to function as the new active write ahead log by the database management module.

Next, at block 904, the new standby write ahead log is populated with existing log entries in the current active write ahead log by the database management module 102 so that the new standby write ahead log has the same log entries as the current active write ahead log.

In an embodiment, the new standby write ahead log is populated by copying the existing log entries in the current active write ahead log to the new standby write ahead log from the latest existing log entry in the current active write ahead log to the earliest existing log entry in the current active write ahead log. This copying process is illustrated in FIG. 10A, where existing log entries of an active write ahead log, i.e., the write ahead log 602A, are being copied to a new replacement standby write ahead log, i.e., the write ahead log 602C. In this example, the log entries are arranged from oldest log entry to the latest log entry from left to right. The log entries G10-S and G-10E are the start and end indicators, respectively, for checkpoint generation G10. In the checkpoint generation G10, there are three insert requests I-0, I-1 and I-2. Similarly, the log entries G11-S and G-11E are the start and end indicators, respectively, for checkpoint generation G11. In the checkpoint generation G11, there are one delete request D-0 and one insert request I-3. As illustrated in FIG. 10A, the existing log entries of the active write ahead log 602A are being copied from right to left, i.e., from the latest log entry, i.e., the log entry G11-E, to the oldest log entry, as indicated by an arrow 1002.

In another embodiment, the new standby write ahead log is populated by copying the existing log entries in the current active write ahead log to the new standby write ahead log from the latest group of existing log entries in the current active write ahead log to the oldest group of existing log entry in the current active write ahead log. The groups may be defined by the checkpoint generation number so that each group may include checkpoint generation start and end indicators for a particular checkpoint generation number and all the log entries positioned between the checkpoint generation start and end indicators. For each group in the current active write ahead log, the existing log entries in that group are copied to the standby write ahead log from the earliest log entry to the latest log entry, e.g., from left to right. This copying process is illustrated in FIG. 10B, where the existing log entries of the active write ahead log 602A are being copied to the new replacement standby write ahead log 602C in groups defined by checkpoint generation numbers. Thus, each group of log entries includes log entries for a particular checkpoint generation. In FIG. 10B, two groups of log entries are illustrated. The first group of log entries is for the checkpoint generation G11. The second (and earlier) group of log entries is for the checkpoint generation G10. As illustrated in FIG. 10B, the existing log entries of the active write ahead log are being copied in groups from right to left, i.e., from the latest group of existing log entries to the oldest group of log entries, as indicated by a dotted arrow 1004. In FIG. 10B, the latest group of log entries, i.e., the group for the checkpoint generation G11, in the active write ahead log 602A is being copied to the standby write ahead log 602C from the earliest log entry in the group, i.e., the log entry G11-S, to the latest log entry in the group, i.e., the log entry G11-E, from left to right, as indicated by an arrow 1006.

Turning back to FIG. 9, in addition to populating the new standby write ahead log, new log entries are written in the new standby write ahead log in parallel with the active write ahead log by the database management module 102, at block 904. That is, new log entries are written in parallel to both the active write ahead log and the new standby write ahead log. This writing process is illustrated in both FIGS. 10A and 10B. For the new standby write ahead log 602C, new log entries are written in the direction from left to right, starting from the immediate right position of the latest log entry G11-E, as indicated by an arrow 1008. The same new log entries are also written in the active write ahead log 602A in the direction from left to right, also starting from the immediate right position of the latest log entry G11-E, as indicated by an arrow 1010.

Figure 11:
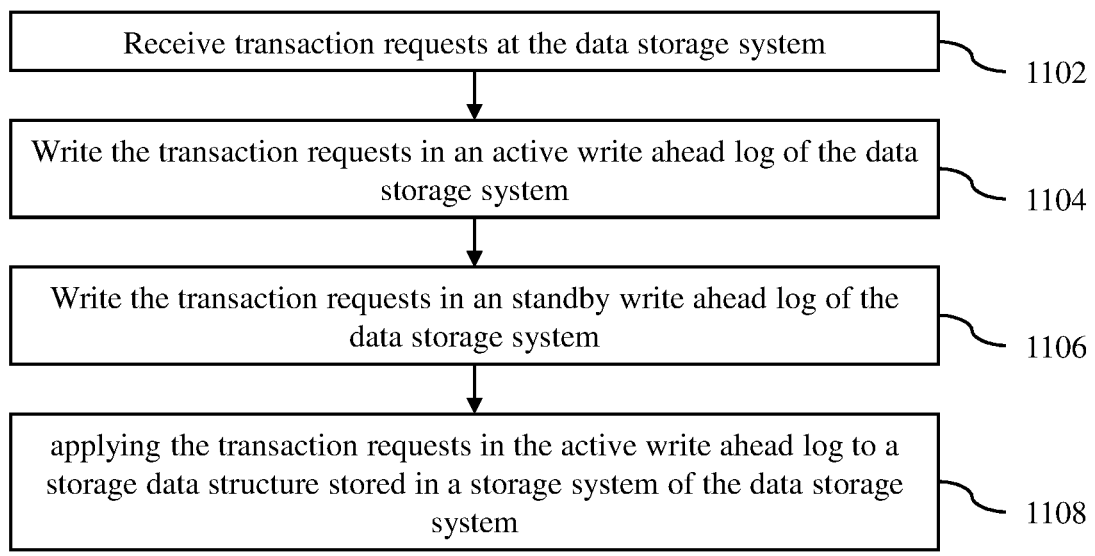
FIG. 11 is a flow diagram of a method of managing transaction requests to a data storage system in accordance with an embodiment of the invention.

A method for managing transaction requests to a data storage system in accordance with an embodiment of the invention is described with reference to a flow diagram of FIG. 11. At block 1102, transaction requests are received at the data storage system. Next, at block 1104, the transaction requests are written in an active write ahead log of the data storage system. Next, at block 1106, the transaction requests are written in a standby write ahead log of the data storage system. Next, at block 1108, the transaction requests in the active write ahead log are applied to a storage data structure stored in a storage system of the data storage system.

The components of the embodiments as generally described in this document and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, non-volatile memory, NVMe device, magnetic tape, a removable computer diskette, a random access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for managing transaction requests to a data storage system, the method comprising:

receiving transaction requests at the data storage system;

writing the transaction requests in an active write ahead log of the data storage system;
writing the transaction requests in a standby write ahead log of the data storage system;
applying the transaction requests in the active write ahead log to a storage data structure stored in a storage system of the data storage system, wherein writing the transaction requests in the active and standby write ahead logs are performed in parallel using a two-phase commit protocol; and
when one of the active or standby write ahead logs has failed:
creating a new standby write ahead log to replace the one of the active or standby write ahead logs that has failed; and
populating the new standby write ahead log with existing log entries in one of the active or standby write ahead logs that has not failed by copying the existing log entries from the one of the active or standby write ahead logs that has not failed to the new standby write ahead log based on when the existing log entries were stored in the one of the active or standby write ahead logs that has not failed,
wherein populating the new standby write ahead log includes copying the existing log entries in the one of the active or standby write ahead logs that has not failed to the new standby write ahead log in a plurality of groups of existing log entries in order from a latest group of existing log entries to an earliest group of existing log entries, wherein at least one of the groups of the plurality of groups comprises at least two log entries, and wherein existing log entries in each group are copied in order from an earliest existing log entry in that group to a latest existing log entry in that group.

2. The method of claim 1, further comprising sending acknowledgement messages back to sources of the transaction requests only after the transaction requests have been written to both the active and standby write ahead logs.

3. The method of claim 2, wherein the active write ahead log is stored in a first storage device of the storage system and the standby write ahead log is stored in a second storage device of the storage system.

4. The method of claim 1, further comprising switching the standby write ahead log to function as a new active write ahead log when the active write ahead log has failed.

5. A non-transitory computer-readable storage medium containing program instructions for managing transaction requests to a data storage system, wherein execution of the program instructions by one or more processors of a computer system causes the one or more processors to perform steps comprising:
receiving transaction requests at the data storage system;
writing the transaction requests in an active write ahead log of the data storage system;
writing the transaction requests in a standby write ahead log of the data storage system;
applying the transaction requests in the active write ahead log to a storage data structure stored in a storage system of the data storage system, wherein writing the transaction requests in the active and standby write ahead logs are performed in parallel using a two-phase commit protocol; and
when one of the active or standby write ahead logs has faded:
creating a new standby write ahead log to replace the one of the active or standby write ahead logs that has faded; and
populating the new standby write ahead log with existing log entries in one of the active or standby write ahead logs that has not failed by copying the existing log entries from the one of the active or standby write ahead logs that has not faded to the new standby write ahead log based on when the existing log entries were stored in the one of the active or standby write ahead logs that has not failed,
wherein populating the new standby write ahead log includes copying the existing log entries in the one of the active or standby write ahead logs that has not faded to the new standby write ahead log in a plurality of groups of existing log entries in order from a latest group of existing log entries to an earnest group of existing log entries, wherein at least one of the groups of the plurality of groups comprises at least two log entries, and wherein existing log entries in each group are copied in order from an earliest existing log entry in that group to a latest existing log entry in that group.

6. The computer-readable storage medium of claim 5, wherein the steps further comprise sending acknowledgement messages back to sources of the transaction requests only after the transaction requests have been written to both the active and standby write ahead logs.

7. The computer-readable storage medium of claim 6, wherein the active write ahead log is stored in a first storage device of the storage system and the standby write ahead log is stored in a second storage device of the storage system.

8. The computer-readable storage medium of claim 5, wherein the steps further comprise switching the standby write ahead log to function as a new active write ahead log when the active write ahead log has failed.

9. A data storage system comprising:
memory; and
a processor configured to:
receive transaction requests at the data storage system;
write the transaction requests in an active write ahead log of the data storage system;
write the transaction requests in a standby write ahead log of the data storage system;
apply the transaction requests in the active write ahead log to a storage data structure stored in a storage system of the data storage system, wherein the transaction requests are written in the active and standby write ahead logs in parallel by the processor using a two-phase commit protocol; and
when one of the active or standby write ahead logs has failed:
create a new standby write ahead log to replace the one of the active or standby write ahead logs that has failed; and
populate the new standby write ahead log with existing log entries in one of the active or standby write ahead logs that has not failed by copying the existing log entries from the one of the active or standby write ahead logs that has not failed to the new standby write ahead log based on when the existing log entries were stored in the one of the active or standby write ahead logs that has not failed,
wherein the processor is configured to populate the new standby write ahead log by copying the existing log entries in the one of the active or standby write ahead logs that has not failed to the new standby write ahead log in a plurality of groups of existing log entries in order from a latest group of existing log entries to an earnest group of existing log entries, wherein at least one of the groups of the plurality of groups comprises at least two log entries, and wherein existing log entries in each group are copied in order from an earliest existing log entry in that group to a latest existing log entry in that group.

10. The data storage system of claim 9, wherein the processor is configured to send acknowledgement messages back to sources of the transaction requests only after the transaction requests have been written to both the active and standby write ahead logs.

11. The data storage system of claim 10, wherein the active write ahead log is stored in a first storage device of the storage system and the standby write ahead log is stored in a second storage device of the storage system.

12. The data storage system of claim 9, wherein the processor is configured to switch the standby write ahead log to function as a new active write ahead log when the active write ahead log has failed.

* * * * *